C. H. HABECKER.
CORN HARVESTER.
APPLICATION FILED JUNE 24, 1910.
1,035,434.
Patented Aug. 13, 1912.
5 SHEETS—SHEET 1.
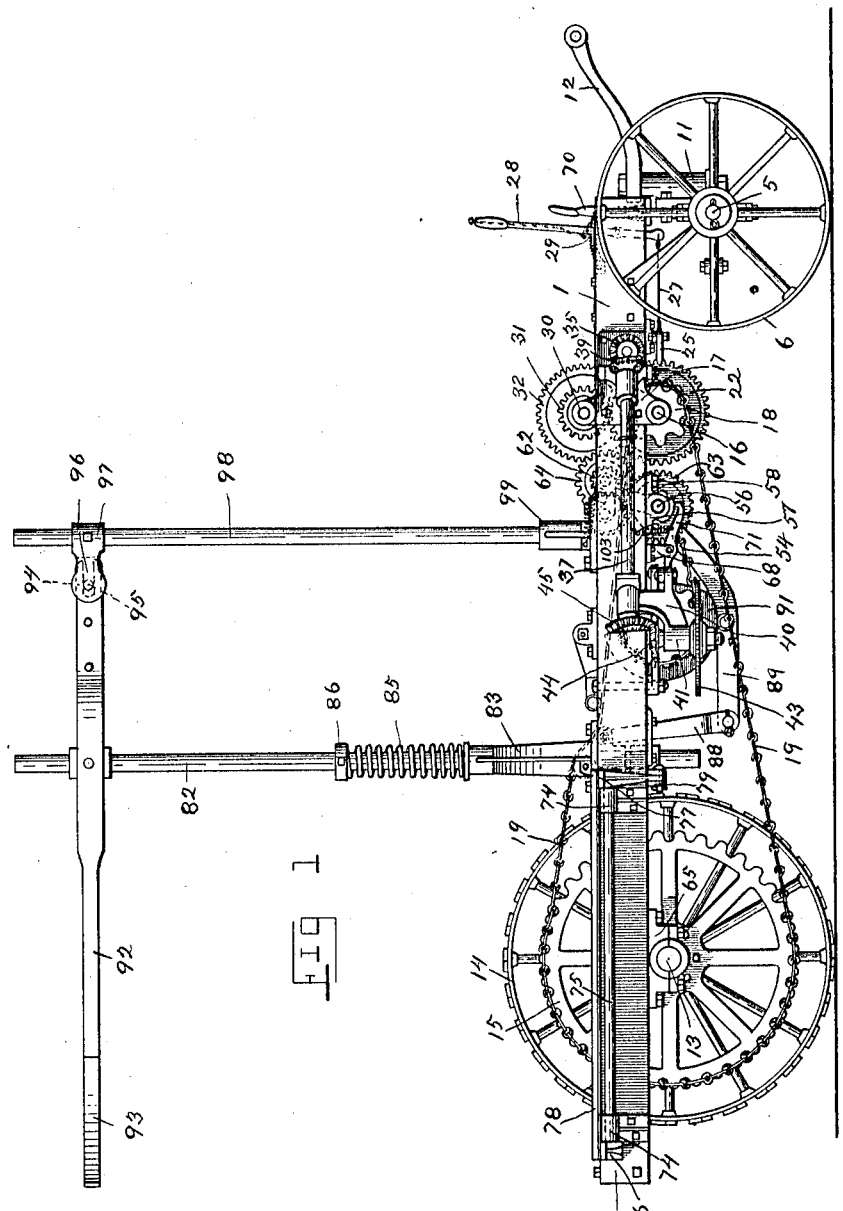
WITNESSES
INVENTOR
Christian H. Habecker,
BY
ATTORNEY C. H. HABECKER.
CORN HARVESTER.
APPLICATION FILED JUNE 24, 1910.
1,035,434.
Patented Aug. 13, 1912.
5 SHEETS—SHEET 2.
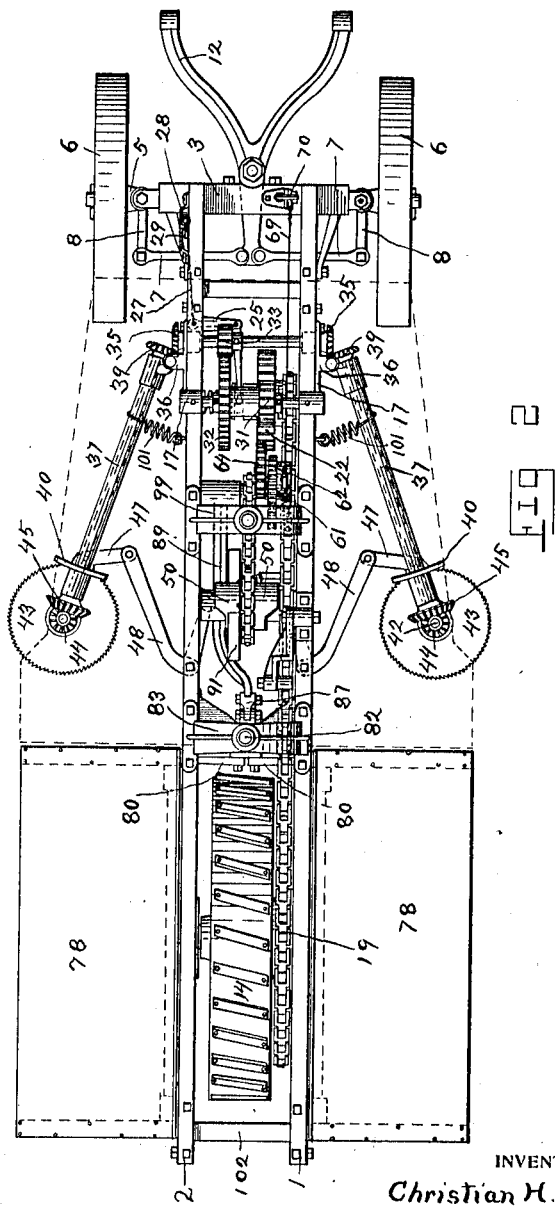
WITNESSES
INVENTOR
Christian H. Habecker,
BY
ATTORNEY C. H. HABECKER.
CORN HARVESTER.
APPLICATION FILED JUNE 24, 1910.
1,035,434.
Patented Aug. 13, 1912.
5 SHEETS—SHEET 3.
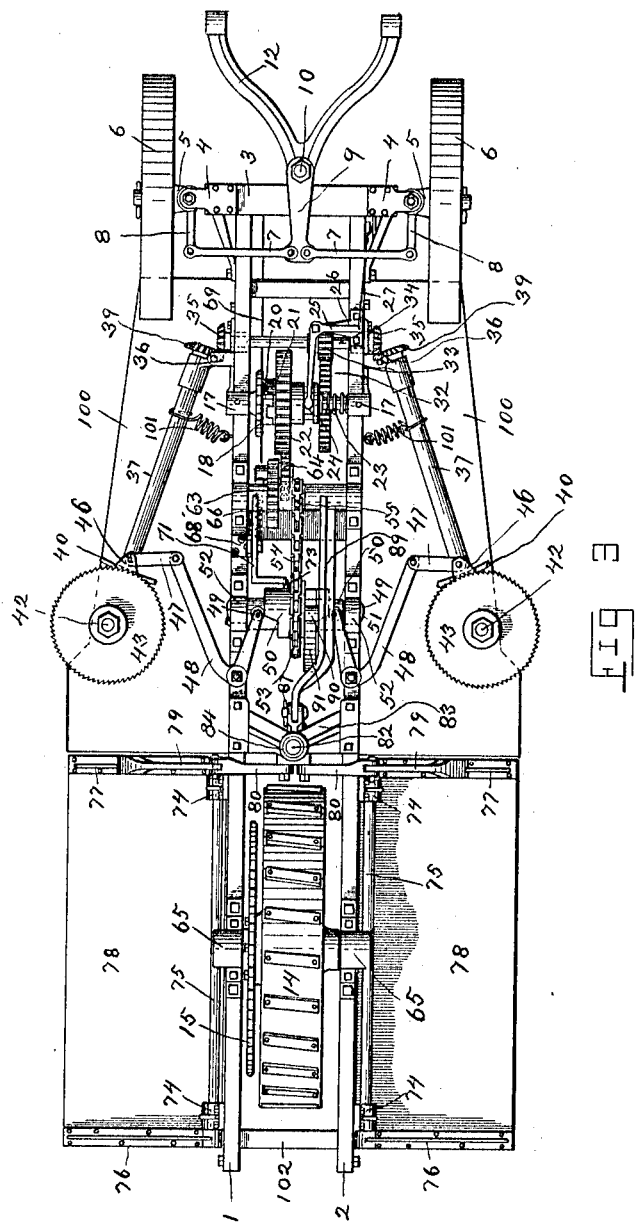
WITNESSES
INVENTOR
Christian H. Habecker,
BY
ATTORNEY

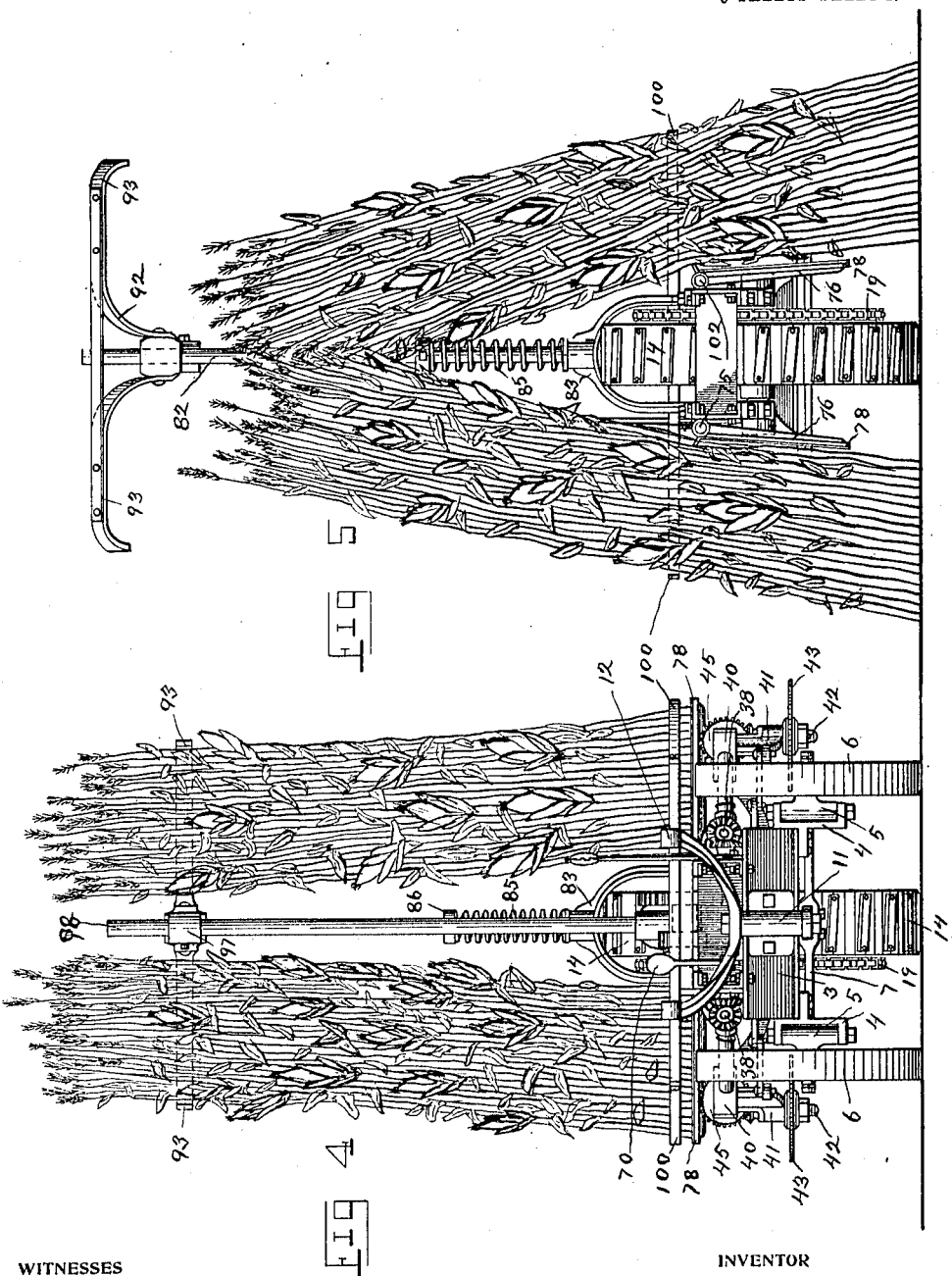

C. H. HABECKER.
CORN HARVESTER.
APPLICATION FILED JUNE 24, 1910.
1,035,434.
Patented Aug. 13, 1912.
5 SHEETS—SHEET 5.
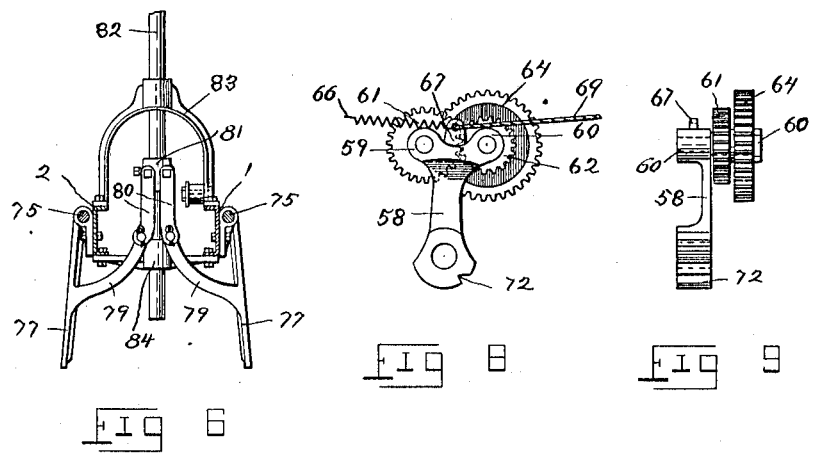
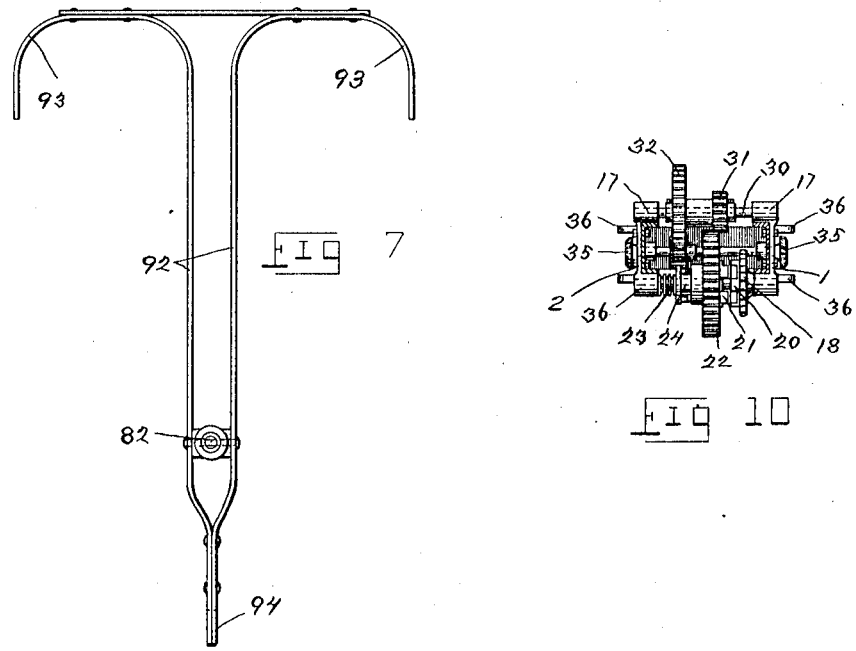
WITNESSES
B. P. Fattin
M. L. Lefevre.
INVENTOR
Christian H. Habecker,
BY
John J. Thompson
ATTORNEY
COLUMBIA PLANOGRAPH CO., WASHINGTON, D. C.

UNITED STATES PATENT OFFICE.

CHRISTIAN H. HABECKER, OF ROHRERSTOWN, PENNSYLVANIA.

CORN-HARVESTER.

1,035,434. Specification of Letters Patent. Patented Aug. 13, 1912.

Application filed June 24, 1910. Serial No. 568,614.

*To all whom it may concern:*

Be it known that I, CHRISTIAN H. HABECKER, a citizen of the United States, residing at Rohrerstown, in the county of Lancaster and State of Pennsylvania, have invented certain new and useful Improvements in Corn-Harvesters, of which the following is a specification, reference being had therein to the accompanying drawing.

My invention relates to an improvement in corn harvesters of that type adapted to harvest standing corn planted in rows; and the invention relates more particularly to that class where it is intended to cut two rows of corn at the same time, and also to shock it and leave it standing upon the ground.

The objects of the invention are to provide a machine of that class which will sever the standing stalks of corn, and drop a sufficient quantity to form a shock; the entire operation being carried on without injury to the stalks or ears and always keeping the stalks in a standing position.

Another object of the invention being to leave a few stalks of corn standing at intervals to form supports or horses to sustain the shock in a standing position, and to which it may be tied; said supports being so left that they form a space between the four corners of which the bundle of cut stalks is dropped, the operation of tying being done by hand; and all being secured together.

With these and other objects in view my invention consists in certain construction and combination of parts as will hereinafter be fully described and claimed in the following specification, and illustrated in the accompanying drawings, which form a part of this application, and in which like figures of reference refer to corresponding parts in all of the views; but it is fully understood that while I have here described my invention as herewith shown, that I do not confine myself to the exact design as shown, as slight changes may be made in the construction and arrangement of the several parts without departing from the spirit of the invention.

In the drawings:—Figure 1, is a side elevation of the apparatus, with the operator's platform removed. Fig. 2, is a top plan view of the same, with the stalk rest removed. Fig. 3, is a bottom plan view of the same, with the drive belt removed. Fig. 4, is a front end elevation, showing the cut stalks upon the table ready to drop. Fig. 5, is a rear end elevation, showing the cut stalks after being dropped. Fig. 6, is a detail end elevational view of the stalk table operating mechanism. Fig. 7, is a detail top plan view of the stalk rest. Fig. 8, is a detail side view of the shift gear. Fig. 9, is an edge view of the same. Fig. 10, is a detail view of drive gears and clutch.

Referring to the drawings, the apparatus comprises the angle iron side frames 1, and 2, to the rearward ends of which is secured the brace 102, and to the forward ends of which is secured the bolster 3, to which are secured the spindle yokes 4, within which are pivoted the spindles 5, upon which are mounted the front wheels 6, which are steered in the usual way by the rods 7, each rod having one end pivoted to one of the spindle arms 8, and the other end pivoted to an arm 9, which is secured upon the lower end of a rod 10, journaled in a bearing bracket 11, secured upon the bolster 3; the upper end of said rod 10, having secured thereon a fork 12, to which the horse is attached by the usual shafts (not shown) and in this way the wheels are guided by the movement of the shafts as the horse is guided.

Near the rear ends of the side frames 1, and 2, and upon the lower angle thereof, are secured the bearings 65, within which is mounted the main axle 13, upon which is mounted the traction wheel 14; said traction wheel 14, having secured upon one side thereof a drive sprocket wheel 15.

Toward the forward end of the machine is rotatably mounted a drive shaft 16, in bearing brackets 17, secured upon the side frames 1, and 2; and upon said shaft 16, is secured a sprocket 18, which is connected by the chain 19, to the drive sprocket 15; and said sprocket 18, is formed with a clutch member 20, formed upon one of its hubs, and which is adapted to engage a clutch member 21, formed upon the adjacent hub of a spur gear 22, which is rotatably mounted on said shaft 16, and normally retained with the clutch members in engagement with each other by a spring 23, mounted upon said shaft 16, between said gear 22, and the side frame 2; while the other hub of said gear 22, is formed with the groove 24, within which runs the yoked end of a bell crank lever 25, for the purpose of operating said clutch; said bell crank lever 25, being pivoted upon a bracket 26, which is secured upon the side frame 2; and operated by a cable 27, connected to a hand lever 28, pivoted upon said side frame 2, and provided with a locking device 29.

Directly above the shaft 16, and in the brackets 17, is mounted a parallel shaft 30, upon which is secured a pinion 31, in mesh with the gear 22, and also secured a gear 32, which drives a pinion 33, secured upon a parallel shaft 34, mounted in the side frames 1, and 2, and upon the outer ends of which are secured the bevel gears 35.

The brackets 17, are formed with ears 36, within which are pivoted the tubular swing saw-arms 37, within which are rotatably mounted the shafts 38, upon the inner ends of which are secured the bevel gears 39, in mesh with the bevel gears 35. Upon the outer end of each of said tubular swing saw-arms 37, is secured a bracket 40, having a vertical bearing 41, within which is mounted a saw-shaft 42, upon the lower end of which is secured a circular saw-blade 43, and upon the upper end of which is secured a bevel gear 44, in mesh and driven by a bevel gear 45, upon the outer end of the shaft 38. Said bracket 40, is also provided with a lug 46, to which is pivoted a link 47; said link 47, having its inner end pivoted to a bell crank 48, which is pivoted upon the side frame and provided upon its inner end with a roller 49, which runs upon a cam 50, secured upon a transverse shaft 51, which is mounted in the bearings 52, secured to the side frames 1, and 2; and as said shaft 51, is rotated the saw-arms 37, will be thrown out into the cutting position shown in Figs. 2, and 3, and receded out of cutting contact with the corn stalks by the action of the springs 101 which connect the arms 37, to the frame bars 1, and 2. Said cams 50, are driven by a sprocket 53, integral therewith, which is connected by the chain 54, to a sprocket 55, which is secured upon a cross-shaft 56, mounted in the bearings 57, attached to the side frames 1, and 2; and upon said shaft 56, is also mounted a swing-arm 58, which is formed with the two bearings 59, and 60; within the bearing 59, is mounted the gear 61, in mesh with the pinion 62, mounted in the bearing 60, and with gear 63, secured upon the shaft 56; said pinion 62, being integral with a gear 64, which can be thrown in and out of engagement with the gear 22, on the shaft 16; and normally retained out of engagement by the action of the spring 66, which is secured to a lug 67, formed on the swing-arm 58, and to a bracket 68, secured to the side frame 1; said lug 67, being also connected by a cable 69, to a foot pedal 70, by the operation of which said shift gears are placed in mesh and temporarily retained therein by the action of a catch arm 71, which is pivoted to the bracket 68, and has a hooked forward end to engage a notch 72, in the hub of said swing-arm 58 and a tension spring 103 secured to the frame; while the rear end of said catch-arm 71, is tripped by a striking pin 73, which projects from the cam 50, thus tripping said catch-arm 71, upon each revolution of said cam 50.

Secured upon the outer faces of the side frames 1, and 2, are hinged brackets 74, within which are mounted hinged rods 75, upon the ends of which are secured the hinged bracket arms 76, and 77, and upon which are mounted the stalk tables 78; the table brackets 77, are each provided with an arm 79, which is connected by a link 80, to a collar 81, and which is secured upon a vertical standard 82, which is reciprocally mounted in a yoke bearing bracket 83, attached to the side frames 1, and 2, and a bearing bracket 84, also attached to the side frames 1, and 2; said reciprocating standard 82, being normally held in a raised position by the action of a spring 85, placed thereon and held in compression against the top of the yoke 83, by a collar 86, secured upon said standard 82. For raising and lowering said standard 82, and the tables 78, operated thereby, the collar 81, is provided with a lug 87, to which is pivoted a link 88, connected to a lever 89, which is pivoted upon the shaft 56; said lever 89, being provided with a stud roller 90, which rides upon a cam 91, integral with the cams 50. Upon the top of said standard 82, is pivoted a stalk rest 92, which is provided with the curved rear ends 93, for holding the stalks and the notched forward end 94, which engages a pin 95, secured in a bifurcated lug 96, formed on an adjustable collar 97, secured upon a stationary standard 98, mounted in a base 99, attached to the side frames 1, and 2. Also secured upon said side frames 1, and 2, are the platforms 100, upon which the operators stand.

The operation of the apparatus is as follows; it requiring a driver to attend to the horse and operate the hand lever and foot pedal, while an attendant is required to stand on each of the platforms to grasp the stalks as they are cut, raise and place them on the tables in an upright position and leaning against the stalk rests. As the machine moves forward between the two rows of corn the traction wheel 14, is revolved, which in turn by the drive chain, 19, revolves the sprocket 18, and clutch member 20, and said clutch member 20, having been brought into engagement with the clutch member 21, by the sliding of the gear 22, as operated by the lever 25, cable 27, and hand lever 28, the train of gears actuated by the gear 22, are all rotated and thus the saws 43, are operated and the standing corn stalks will be cut and then placed on the table by the attendants, and when a sufficient quantity has been deposited on the tables, the driver, by actuating the foot pedal 70, by the cable 69, moves the arms 58 forwardly and thus causes the catch 71, to engage the ratchet 72, bringing the train of gears 61, 62, and 64, into operation, and by the sprockets 53, and 55, and the drive chain 54, revolving the cams 50, and 91, thus allowing the saw arms 37, to recede as actuated by the springs 101, the tables 78, to be lowered and at the same time the rest 92, to be raised, thus releasing the cut stalks which are deposited upon the ground in a standing position; the operation then being repeated.

Having thus described my invention what I claim as new and desire to secure by Letters Patent is:—

1. A corn harvester of the class described, comprising a frame, steering wheels mounted upon the forward end of said frame, a traction wheel mounted near the rear end of said frame, a drive sprocket secured upon said traction wheel, a main shaft mounted upon said frame, a sprocket mounted upon said shaft and a chain connecting the two sprocket wheels, swing saw-arms pivoted upon said frame, rotary cutters mounted upon the outer ends of said arms, mechanism for operating said cutters from said main shaft, means for swinging said arms, stalk supporting tables hinged to the sides of said frame, means for automatically raising and lowering said tables, and means for supporting the stalks in an upright position.

2. A corn harvester of the class described, comprising a frame, a traction wheel mounted in said frame, a main shaft mounted in said frame, and means for operating said main shaft by said traction wheel, a clutch carried by said shaft, an arm mounted adjacent thereto, for the purpose of operating said clutch, a counter shaft mounted in said frame adapted to be rotated by said main shaft, a cam shaft mounted in said frame, means for rotating the same by the main shaft, swinging saw-arms pivoted upon said frame, rotary cutters mounted upon said arms, means for rotating said cutters from said counter shaft, a cam mounted upon said cam shaft for swinging said saw arms, drop tables hinged upon said frame, a second cam mounted upon said cam shaft for operating said drop tables, an overhead stalk rest secured upon said frame, means for raising and lowering said rest by the action of said tables, and means for rotating all of said shafts from said traction wheel.

In testimony whereof I affix my signature in presence of two witnesses.

CHRISTIAN H. HABECKER.

Witnesses:
 Wm. J. Coulter,
 John J. Thompson.